(12) United States Patent
Grunwald et al.

(10) Patent No.: US 11,746,671 B2
(45) Date of Patent: Sep. 5, 2023

(54) CONNECTION STRUCTURE FOR A GENERATOR ASSEMBLY

(71) Applicants: General Electric Company Polska sp. z o.o., Warsaw (PL); General Electric Deutschland Holding GmbH, Frankfurt (DE)

(72) Inventors: Maciej Grunwald, Warsaw (PL); Łukasz Maciej Janczak, Warsaw (PL); Adam Tomasz Paziński, Warsaw (PL); Pawel Piotr Hańczewski, Warsaw (PL); Mohamed Osama, Garching (DE)

(73) Assignees: General Electric Company Polska sp. z o.o., Warsaw (PL); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 17/397,290

(22) Filed: Aug. 9, 2021

(65) Prior Publication Data

US 2022/0056810 A1    Feb. 24, 2022

(30) Foreign Application Priority Data

Aug. 20, 2020   (PL) .......................................  435036

(51) Int. Cl.
  *F01D 15/10* (2006.01)
  *F01D 9/06* (2006.01)
  (Continued)

(52) U.S. Cl.
  CPC ............. *F01D 15/10* (2013.01); *F01D 9/065* (2013.01); *F02C 7/32* (2013.01); *H02K 7/18* (2013.01);
  (Continued)

(58) Field of Classification Search
  CPC .......... F01D 15/10; F01D 9/065; F01D 25/12; F01D 5/005; F02C 7/32; F02C 7/12;
  (Continued)

(56) References Cited

U.S. PATENT DOCUMENTS 3,791,682 A    2/1974   Mitchell
3,816,751 A    6/1974   Jampen et al.
(Continued)

FOREIGN PATENT DOCUMENTS

CN    111828198 A    10/2020
EP      1921310 A1    5/2008
(Continued)

OTHER PUBLICATIONS

Polish Search Report for PL Application No. P-435036 dated Mar. 9, 2021 (11 pages with English Translation).

*Primary Examiner* — Gerald L Sung
*Assistant Examiner* — Rene D Ford
(74) *Attorney, Agent, or Firm* — Dinsmore & Shohl LLP

(57) ABSTRACT

A generator assembly includes a stator assembly coupled to an engine stator component of a propulsion engine, the stator assembly including: a stator support structure fixedly attached to the engine stator component; a stator disposed on a supporting surface of the stator support; a manifold coupled to the stator support, the manifold defining a connection volume and including at least one coolant opening at a connection end of the manifold; and an electrical connector extending between the stator and a connection device disposed on the connection end. The generator assembly also includes a rotor assembly comprising a rotor support structure connected to a shaft of the propulsion engine and a rotor attached to the rotor support structure, wherein the
(Continued)

rotor rotates in conjunction with the shaft to generate a power signal that travels through the electrical connector to the connection device.

8 Claims, 7 Drawing Sheets

(51) Int. Cl.
*F02C 7/32* (2006.01)
*H02K 7/18* (2006.01)
*F01D 25/12* (2006.01)
*F02C 7/12* (2006.01)
*F02C 7/18* (2006.01)

(52) U.S. Cl.
CPC .............. *F01D 25/12* (2013.01); *F02C 7/12* (2013.01); *F02C 7/18* (2013.01); *F05D 2220/323* (2013.01); *F05D 2220/76* (2013.01); *F05D 2260/20* (2013.01); *F05D 2260/608* (2013.01)

(58) Field of Classification Search
CPC ...... F02C 7/18; F02C 9/18; F02C 6/00; F02C 6/20; F02C 7/00; H02K 7/18; F05D 2220/323; F05D 2220/76; F05D 2260/20; F05D 2260/608; F05D 2230/80; Y02T 50/60; F02K 1/04
See application file for complete search history.

(56) References Cited

U.S. PATENT DOCUMENTS

| | | |
|---|---|---|
| 7,009,103 B2 | 3/2006 | Pitschi |
| 8,522,522 B2 | 9/2013 | Poisson |
| 8,853,532 B2 | 10/2014 | Eshima et al. |
| 9,038,398 B2 | 5/2015 | Suciu et al. |
| 9,097,134 B2 | 8/2015 | Ferch et al. |
| 9,917,490 B2 | 3/2018 | Lemmers et al. |
| 10,071,811 B2 | 9/2018 | Kupiszewski et al. |
| 10,093,428 B2 | 10/2018 | Kupiszewski et al. |
| 10,422,282 B2 | 9/2019 | Williams |
| 10,436,119 B2 | 10/2019 | Kwakye et al. |
| 2018/0050806 A1* | 2/2018 | Kupiszewski ............ F02C 7/32 |
| 2019/0019601 A1 | 1/2019 | Aslam |
| 2020/0325821 A1* | 10/2020 | Hughes ................... F02C 3/103 |
| 2022/0045573 A1* | 2/2022 | Seki ....................... H02K 5/225 |

FOREIGN PATENT DOCUMENTS

| | | |
|---|---|---|
| EP | 3751119 A1 | 12/2020 |
| RU | 2018121769 A | 12/2019 |

* cited by examiner

US 11,746,671 B2

CONNECTION STRUCTURE FOR A GENERATOR ASSEMBLY

CROSS REFERENCE TO RELATED APPLICATION

The present application claims the priority benefit of Polish Patent Application No. P-435036, entitled "Connection Structure for a Generator Assembly" and filed Aug. 20, 2020, the entire contents of which is hereby incorporated by reference herein.

BACKGROUND

Field

The present specification generally relates to a gas turbine engine including an embedded electrical machine and, more particularly, connections between the electrical machine and other components of the gas turbine engine.

Technical Background

Incorporating an electrical machine (e.g., an electrical generator) into a propulsion engine to generate electrical power from mechanical energy generated by the propulsion engine may enhance the capabilities of aircraft by eliminating the need for heavy and bulky energy storage devices on the aircraft. For example, the electrical power generated by the electrical machine may be used to operate an accessory propulsor (e.g., an electric fan, motor, or the like) to supplement thrust provided via the turbine engine. Introduction of such an electrical machine, however, may introduce challenges relating to size, weight, accessibility, and aerodynamic performance.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
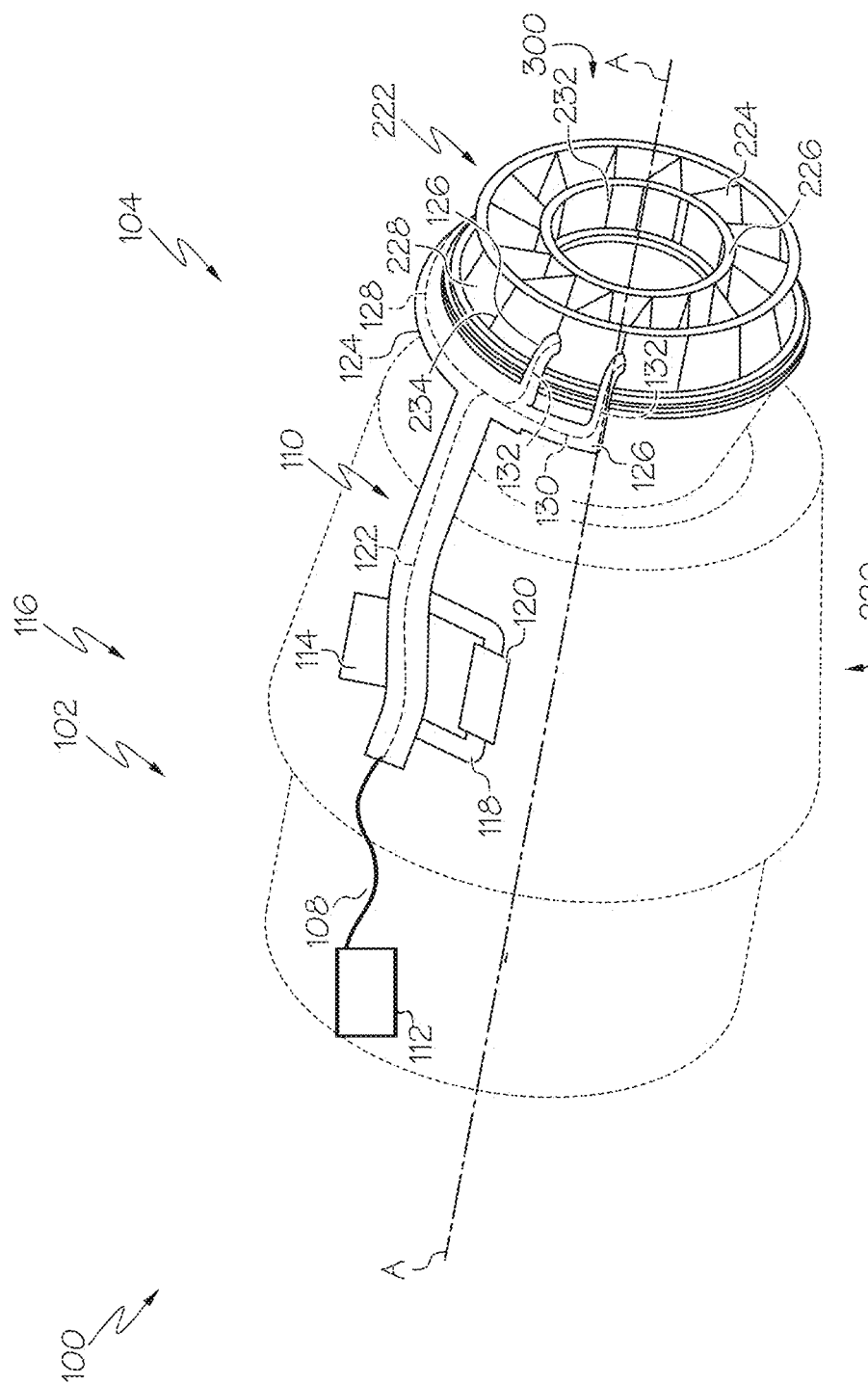
FIG. 1 schematically depicts a propulsion engine including an electrical system, according to one or more embodiments described herein.

Reference will now be made to generator assemblies for integration into a propulsion engine such as a turbine engine. In various embodiments, the generator assemblies described herein include a single structure that forms various different types of connections (e.g., mechanical, fluidic, electrical) between the generator assembly and the propulsion engine that are conventionally formed separately. For example, various embodiments described herein include a stator assembly that includes a manifold incorporating both an electrical connection device for conductively coupling an electrical connection line extending through the propulsion engine and a coolant opening for receiving coolant from a cooling duct of the propulsion engine. Both the electrical connection device and the coolant opening may be disposed on a connection end of the manifold such that the generator assembly may be both fluidly coupled to the cooling duct and the electrical connection line via a single structure.

The integrated connections for the generator assemblies described herein provide weight and size savings over existing approaches for incorporation of generator assemblies into propulsion engines. Such weight and size savings may improve performance of the generator assembly. For example, if the size and weight of the generator assembly is too large, any propulsive benefits attained via the electrical power generated by the generator assembly may be outweighed by a reduction in aerodynamic performance in the propulsion engine. Such concerns may be even more pronounced in situations where the electrical power generated via the generator assembly is communicated through the propulsion engine or where the generator assembly is situated in a relatively hot portion of the turbine engine (e.g., within a tail cone of the turbine engine).

The integration of the connections described herein beneficially facilitates making the generator assembly as compact as possible, reducing weight and enhancing aerodynamic performance. To facilitate forming the integrated connection described herein, the electrical connection lines of the propulsion engines described herein may be routed through cooling ducts such that the coolant and the electrical connection lines are collocated. Not only does such a configuration facilitate making the integrated connection described herein, but it also provides the additional benefit of the electrical connection lines being cooled by coolant circulating in the cooling duct. Such cooling reduces the need for thermal insulation of the electrical connector lines, further reducing the overall weight of the electronics associated with the generator assembly.

Moreover, the positioning of the generator assembly described herein (e.g., in an aft portion of the engine proximate to a turbine rear frame) beneficially renders the generator accessible for maintenance and repair while the propulsion engine and generator assembly are installed an aircraft (e.g., on a wing, on a fuselage, or the like). Additionally, in embodiments, the generator assembly may be positioned within a tail cone of the propulsion engine and be directly accessible for repairs after performance of a non-invasive procedure (e.g., opening of core cowl, removal of aft skin, and removal tail cone) on the remainder of the propulsion engine. This way, the generator assembly may be efficiently maintained while not disrupting operation of the other components of the propulsion engine. Such non-invasive access to the generator assembly beneficially facilitates maintenance and repair of the generator assembly while the propulsion engine is installed on an aircraft (e.g., on a wing, a fuselage, or the like of the aircraft).

Figure 2:
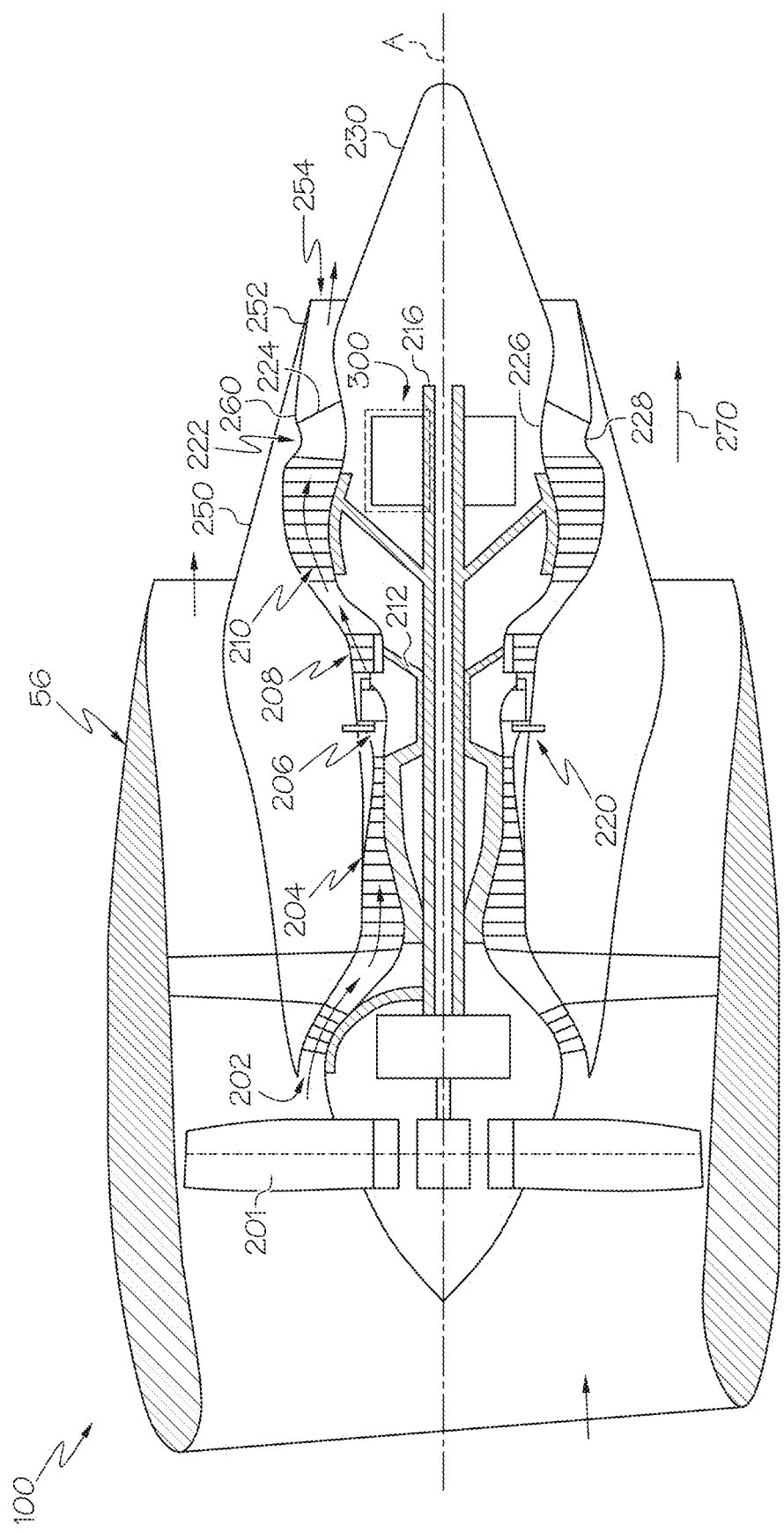
FIG. 2 depicts a cross-sectional view of the propulsion engine depicted in FIG. 1 above a central axis A-A thereof, according to one or more embodiments described herein.

Referring to FIGS. 1 and 2, a propulsion engine 100 including an electrical system 102 and a cooling system 110 is schematically depicted. The propulsion engine 100 may take various forms depending on the implementation. In the embodiments described herein, the propulsion engine 100 is a high-bypass turbofan engine. However, other types of turbine engines are contemplated and are within the scope of the present disclosure. As depicted in FIG. 1, the electrical system 102 includes a generator assembly 300 disposed in an aft portion 104 of the propulsion engine 100. The aft portion 104 is disposed axially downstream (e.g., in a direction parallel to a central axis A-A of the propulsion engine 100) of a core portion 220 of the propulsion engine 100. The generator assembly 300 converts mechanical energy (e.g., generated from exhaust gases generated in the core portion 220) produced by the propulsion engine 100 into electrical energy that may be used to power electrical devices of the propulsion engine 100 or components disposed elsewhere on an aircraft (including components that incorporate the propulsion engine 100). As described herein, positioning the generator assembly 300 in the aft portion 104 of the propulsion engine 100 beneficially renders the generator assembly 300 accessible for maintenance, repair, and replacement while the propulsion engine 100 is disposed on an aircraft (e.g., on a wing or fuselage of the aircraft). The generator assembly 300 is designed to be integrated into the propulsion engine 100 via a set of connections that may be removed without invasively disassembling the entirety of the propulsion engine 100 (e.g., removing without detaching the propulsion engine 100 from the aircraft).

In embodiments, the generator assembly 300 may be attached to an inner hub 226 of a turbine rear frame 222 of the propulsion engine 100 via a generator coupler (not depicted in FIG. 1) that beneficially collocates connections of the generator assembly 300 between the electrical system 102 and the cooling system 110. Example embodiments of the structure of the generator assembly 300 are described in greater detail herein with respect to FIGS. 3 and 5 herein. Still referring to FIG. 1, it should be understood that the depicted arrangement of the propulsion engine 100 is only exemplary is not intended to be limiting. For example, in alternative embodiments, the generator assembly 300 may be disposed axially forward of the core portion 220.

Positioning the generator assembly 300 in the aft portion 104 provides accessibility, but creates additional design considerations for the propulsion engine 100. Exhaust gases generated via the core portion 220 are at relatively high temperatures (e.g., in excess of about 700° C. or more in various embodiments), which renders cooling the generator assembly 300 beneficial. Additionally, the aft portion 104 of the propulsion engine 100 may not be directly connected to an aircraft incorporating the propulsion engine 100. Given this, to provide the electrical power generated via the generator assembly 300 to other portions of the aircraft, the electrical power is routed to a different portion propulsion engine 100.

In view of the foregoing, the electrical system 102 includes a connection assembly 108 that is routed through the cooling system 110. The connection assembly 108 includes a plurality of electrical connector lines (e.g., power cables) that conductively connect the generator assembly 300 to a converter 112. For example, the generator assembly 300 may generate an alternating current ("AC") power signal via the mechanical energy generated via the remainder of the propulsion engine 100 that is provided to the converter 112 via the connection assembly 108. While the converter 112 is depicted in FIG. 1 as being disposed in a forward position within the propulsion engine 100, it should be understood that, in embodiments, the converter 112 may be disposed in a central portion (e.g., extending radially outward of the core portion 220) or the aft portion 104 of the propulsion engine 100. In embodiments, the converter 112 may be disposed externally to the propulsion engine 100 (e.g., in a pylon or elsewhere in the aircraft). In embodiments, the converter 112 may be disposed within the cooling system 110 (e.g., in any of the cooling ducts 122, 124, and 126 described herein) such that the connection assembly 108 (or a portion thereof) routes a converted DC power signal.

Still referring to FIG. 1, the converter 112 may generate DC output voltages from the AC power signal to provide DC power for alternative locations on the aircraft (e.g., via an electrical communications bus, not depicted). The structure of the converter 112 and connection assembly 108 may vary depending on the structure and capabilities of the generator assembly 300. For example, in various embodiments, the generator assembly 300 may generate an AC power signal having any number of phases (e.g., one phase, two phases, three phases, four phases, etc.). The connection assembly 108 may include a plurality of sets of electrical connector lines, with each set of electrical connector lines including a number of electrical connector lines that corresponds to the number of phases in the AC power signal generated via the generator assembly 300. The number of sets of electrical connector lines of the connection assembly 108 may vary depending on the implementation. Incorporating a number of different sets of electrical connector lines in the connection assembly 108 beneficially provides electrical connection redundancies that facilitate provision of the AC power signal to the converter 112 even if one of the sets of the electrical connector lines fails during operation.

Referring still to FIG. 1, the cooling system 110 routes cooling air (e.g., from a bypass section 116 disposed radially outward of the core portion 220) to the generator assembly 300 to maintain the generator assembly 300 in a temperature range despite the generator assembly 300 being disposed proximate to high temperature exhaust generated via the core portion 220. In embodiments, the cooling system 110 includes a valve 114 in fluid communication with the bypass section 116. In embodiments, the valve 114 may be controlled by a controller (not depicted) that may open the valve 114 to allow entry of cooling air into the cooling system 110 during operation of the propulsion engine 100. The cooling system 110 further includes a bypass cooling duct 118 including a fan 120 that may be controlled via the controller to operate during time periods when the valve 114 is closed such that cooling air may be provided to the generator assembly 300 irrespective of a state of operation of the propulsion engine 100. Additionally, the converter 112 may be designed to incorporate any number of phases depending on the implementation of the generator assembly 300.

In embodiments, the cooling system 110 includes a plurality of different cooling ducts having structures extending in different directions at various positions within the propulsion engine 100. As depicted, the cooling system 110 includes a main cooling duct 122, a circumferential cooling duct 124, and a plurality of generator cooling ducts 126. In embodiments, the main cooling duct 122, the circumferential cooling duct 124, and the plurality of generator cooling ducts 126 possess structures that are dependent on positioning within the propulsion engine 100. In embodiments, the main cooling duct 122, the circumferential cooling duct 124, and the plurality of generator cooling ducts 126 are designed to provide adequate space for routing the connection assembly 108 to the generator assembly 300 while minimizing impacts on aerodynamic performance of the propulsion engine 100. Example embodiments of various cooling ducts, including, but not limited to, the main cooling duct 122, the circumferential cooling duct 124, and the plurality of generator cooling ducts 126 are described in more detail herein with respect to FIGS. 6A, 6B, and 6C.

Referring still to FIG. 1, the main cooling duct 122 receives cooling air from the valve 114 and directs the cooling air towards the aft portion 104 where the generator assembly 300 is disposed. The circumferential cooling duct 124 divides the cooling air into circumferential portions and directs the cooling air in a circumferential direction around an outer casing 228 of the turbine rear frame 222. In embodiments, the plurality of generator cooling ducts 126 divide each circumferential portion of the cooling air into cooling portions that are provided to the generator assembly 300 via struts 224 of the turbine rear frame 222. In embodiments, the cooling system 110 may include any number of generator cooling ducts 126. In some embodiments, the number of generator cooling ducts 126 may correspond to a number of the plurality of struts 224 of the turbine rear frame 222 through which coolant is provided to the generator assembly 300. As should be understood in view of the description of the turbine rear frame 222 contained herein, the number of the plurality of struts 224 through which coolant is provided to the generator assembly 300 may vary depending on the implementation. For example, in embodiments, coolant may be provided to the generator assembly 300 through at least two of the plurality of struts 224 (e.g., two, four, six, or eight of the plurality of struts). In such embodiments, the cooling system 110 may include a corresponding number of generator cooling ducts 126 that provide coolant into a corresponding strut of the turbine rear frame 222.

In embodiments, the generator cooling ducts 126 extend through the struts 224 into a generator coupler (not depicted in FIG. 1) in fluid communication with the generator assembly 300 to cool the generator assembly 300. An example embodiment of the generator coupler is described herein with respect to FIGS. 3 and 4A herein. In embodiments, each of the generator cooling ducts 126 attach to a radially outer end 234 of one of the struts 224 to provide cooling air into an internal cavity defined by the strut to which that generator cooling duct 126 is attached.

As depicted in FIG. 1, the electrical connector lines of the connection assembly 108 extend through the main cooling duct 122, the circumferential cooling duct 124, the plurality of generator cooling ducts 126 and the struts 224 of the turbine rear frame 222 to conductively connect the converter 112 to the generator assembly 300. In embodiments, various sets electrical connector lines of the electrical connection assembly 108 extend through different combinations of cooling ducts of the cooling system 110 to connect different portions (e.g., terminations) of the generator assembly 300 to the converter 112. For example, a first subset of electrical connector lines 128 may be directed through a first portion of the circumferential cooling duct 124 and a second subset of electrical connector lines 130 may be directed through a second portion of the circumferential cooling duct 124. The first and second subsets of electrical connector lines 128 and 130 may be further divided such that baseline sets of electrical connector lines 132 are routed through each generator cooling duct 126, through one of the struts 224, and into a generator coupler for electrical connection to the generator assembly 300 described herein.

FIG. 2 depicts a sectional view of the propulsion engine 100 depicted in FIG. 1 taken above the central axis A-A. The propulsion engine 100 includes a fan 201, a low pressure compressor 202, a high pressure compressor 204, and a combustor 206, which mixes air compressed via the high pressure compressor 204 with fuel for generating combustion gases that flow downstream through a high pressure turbine 208 and a low pressure turbine 210 to generate pressurized exhaust. A first shaft 212 joins the high pressure compressor 204 to the high pressure turbine 208. A second shaft 216 joins the low pressure turbine 210 to the fan 201 and the low pressure compressor 202. In embodiments, the high pressure compressor 204, the combustor 206, and the high pressure turbine 208 may collectively form the core portion 220. The core portion 220 may generate combustion gases that are channeled to the low pressure turbine 210, which in turn powers the fan 201 via the second shaft 216. The low pressure turbine 210 may include a plurality of rows of blades that rotate in response to the combustion gases from the core portion 220 and thereby cause the second shaft 216 to rotate, thereby powering the fan 201, low pressure compressor 202, and the generator assembly 300.

The turbine rear frame 222 is disposed aft of the low pressure turbine 210 (e.g., offset from the low pressure turbine 210 in an aft direction 270 extending parallel to the central axis A-A). The turbine rear frame 222 includes a plurality of struts 224 extending between an inner hub 226 and an outer casing 228. The turbine rear frame 222 provides an exhaust flow path for exhaust flowing from the low pressure turbine 210. The inner hub 226 and the outer casing 228 may circumferentially surround the second shaft 216 and the plurality of struts 224 may be distributed around the second shaft 216. In embodiments, the plurality of struts 224 function as outlet guide vanes to straighten the exhaust airflow, which may flow over a tail cone 230 to improve performance of the propulsion engine 100. It should be understood that the turbine rear frame 222 may include any number of struts 224 in any arrangement consistent with the present disclosure.

Referring still to FIG. 2, the propulsion engine 100 includes a core cowl 250 and an aft skin 252. The core cowl 250 delineates a flow path air compressed by the fan 201. In embodiments, the aft skin 252 is connected to the outer casing of the turbine rear frame 222 via a bolted connection 260. In embodiments, exhaust exits the propulsion engine via an outlet 254 defined by the turbine rear frame 222, the aft skin 252, and the tail cone 230. In embodiments the core cowl 250 includes a hinge or the like such that the core cowl 250 may be opened with respect to the aft skin 252.

Figure 3:
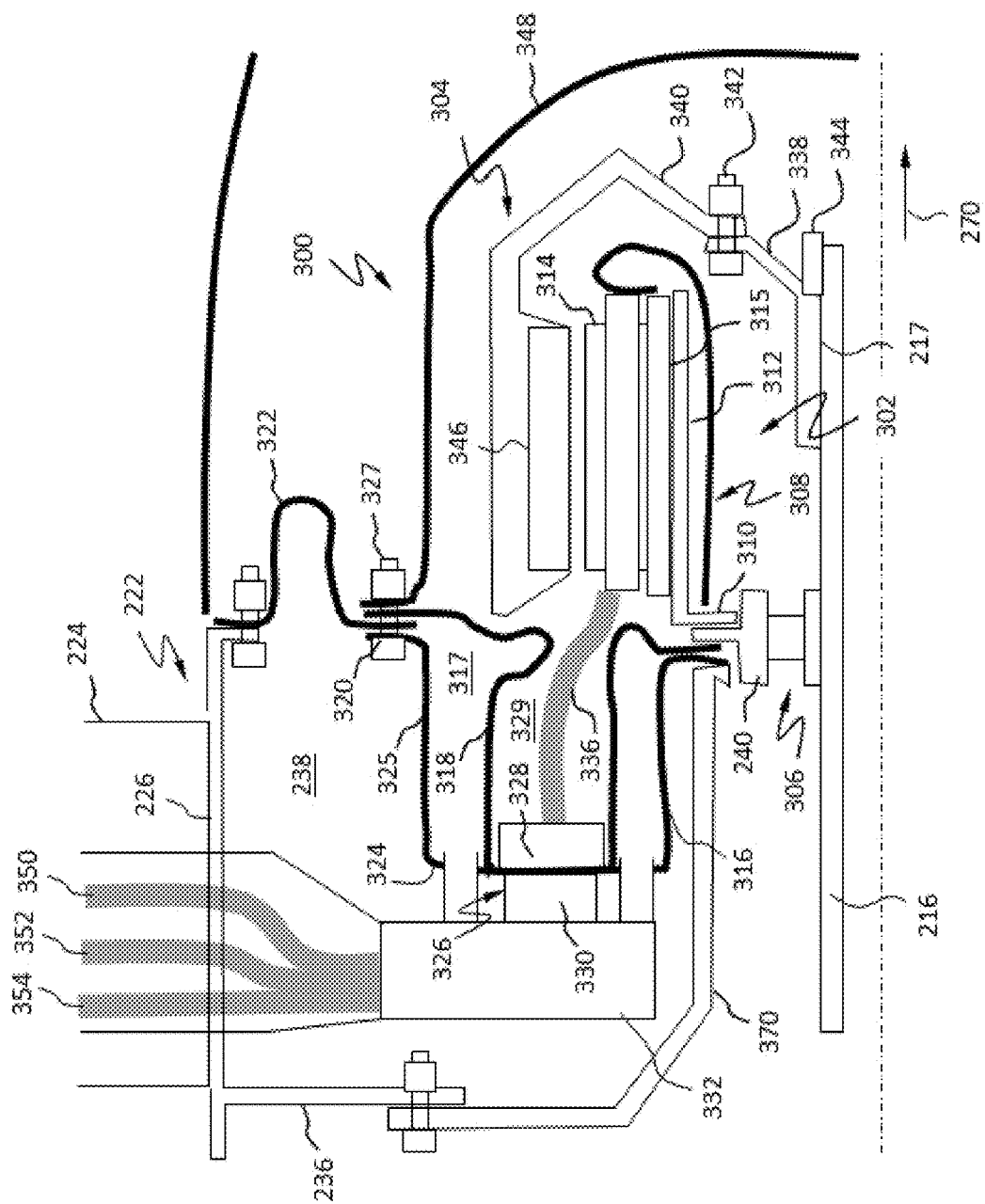
FIG. 3 depicts an enlarged view of a generator assembly of the propulsion engine depicted in FIGS. 1-2, according to one or more embodiments described herein.

Referring now to FIG. 3, a detailed view of the generator assembly 300 depicted in the dashed boundary of FIG. 2 is shown. The generator assembly 300 includes a stator assembly 302 including a stator 314 and a rotor assembly 304 including a rotor 346. The rotor assembly 304 includes a rotor support structure 338 that is attached to the second shaft 216 via a locking nut 344. In embodiments, the rotor support structure 338 includes an attachment element (e.g., a groove, protrusion, or the like, which is not depicted) that slidably engages with a corresponding attachment element on the second shaft 216. For example, in embodiments, the rotor support structure 338 may slidably engage with the second shaft 216 at an aft end 217 of the second shaft 216. The locking nut 344 may secure the rotor support structure 338 to the second shaft 216 such that the rotor assembly 304 rotates in conjunction with the second shaft 216 to facilitate generation of electrical power via the rotation of the second shaft 216.

The rotor assembly 304 further includes a rotor attachment arm 340 attached to the rotor support structure 338 via a bolt 342. The rotor attachment arm 340 maintains the rotor 346 in spaced relation to the stator 314. In embodiments, the rotor 346 comprises a plurality of permanent magnets circumferentially distributed about the stator 314 such that rotation of the rotor 346 about the stator 314 generates an AC power signal. It should be understood that alternative configurations for the rotor 346 are envisioned depending on the implementation of the generator assembly 300. For example, in embodiments, the rotor 346 may include a plurality of electromagnets and active circuitry. Various implementations are envisioned wherein the generator assembly 300 is configured as an induction type generator, a switched reluctance generator, an asynchronous AC electrical machine, or any suitable type of electric generator.

The stator assembly 302 is attached to an engine stator component (e.g., a turbine frame, such as the turbine rear frame 222). The stator assembly 302 includes a stator support assembly 308 that includes a mounting flange 310 that is coupled to the a bearing housing 240 of the bearing assembly 306 via a connection bolt (not depicted). The inner hub 226 of the turbine rear frame 222 supports the second shaft 216 via a support structure 236 and a bearing support 370 extending radially outward from the second shaft 216. As depicted, the inner hub 226, the support structure 236, and the bearing support 370 delineate a substantially annular-shaped coupling cavity 238 for coupling the generator assembly 300 to the struts 224 of the turbine rear frame 222. As shown, the bearing housing 240 is attached to both the support structure 236 and the mounting flange 310 of the stator support assembly 308. Integrating the connections of the turbine rear frame 222 and the stator support assembly 308 beneficially saves space and reduces the overall weight of the generator assembly 300.

The stator assembly 302 further includes a stator support structure 312 on which a stator 314 of the generator assembly 300 is disposed. In embodiments, the stator support structure 312 comprises a stator support surface 313 and a liquid cooling jacket 315 (e.g., an oil cooling jacket). Still referring to FIG. 3, in embodiments, the stator 314 includes a plurality of windings conductively connected to an electrical connector 336. While the stator 314 is depicted to be disposed radially inward from the rotor assembly 304, it should be appreciated that alternative embodiments are envisioned where substantially the entirety of the stator assembly 302 (e.g., including the stator 314) is disposed radially outward relative to the rotor assembly 304.

The stator assembly 302 further includes a cooling manifold 316 coupled to the stator support assembly 308 at the mounting flange 310. As depicted, the stator support assembly 308 generally extends in the aft direction 270 from the mounting flange 310 to define the stator support surface 313. The cooling manifold 316 extends in the fore direction (e.g., opposite to the aft direction 270) from the mounting flange 310. The cooling manifold 316 includes a connection end 324 extending substantially in the radial direction to define a coolant cavity 317 through which the generator assembly 300 is fluidly coupled to the cooling system 110 and conductively coupled to remainder of the electrical system 102 described herein. The cooling manifold 316 includes an aft portion 325 extending toward the aft direction 270 from the connection end 324 to a mounting flange 320. As depicted, a connection bolt 327 extends through the mounting flange 320, a connection tab 322 extending from the inner hub 226 of the turbine rear frame 222, and a thermal shield 348 of the generator assembly 300. In embodiments, the thermal shield 348 does not directly attach to the second shaft 216 but rather circumferentially surrounds the aft end 217 of the second shaft 216, the stator assembly 302, and the rotor assembly 304. As such, the cooling manifold 316 and the thermal shield 348 are connected to the turbine rear frame 222 via a single connection point (via a plurality of connection bolts 327 extending around the circumference of the mounting flange 320). Such an integrated connection beneficially facilitates efficient maintenance of the generator assembly 300, particularly in embodiments where the propulsion engine 100 (FIG. 2) is located on an aircraft (e.g., installed on a wing or fuselage). That is, the integrated connection allows for access to the generator assembly 300 without removal of the propulsion engine 100 (FIG. 2) from an aircraft.

Still referring to FIG. 3, the stator assembly 302 further includes a coolant guide 318 attached the mounting flange 320. The coolant guide 318 may guide coolant received via the cooling manifold 316 to the rotor 346 and stator 314. The coolant guide 318 defines a connection cavity 329 housing a connection device 326 that receives the electrical connector 336. The coolant guide 318 is also coupled to the inner hub 226 and the aft portion 325 of the cooling manifold 316 via the connection bolt 327. The connection device 326 is an electrical coupler configured to create a conductive connection between the electrical connector 336 attached to the stator 314 and electrical connector lines 350, 352, 354 extending through the one of the struts 224 of the turbine rear frame 222. As depicted, the connection device 326 includes a first portion 328 (e.g., a female port receiving conductors of the electrical connector 336 or a male port engaging with the electrical connector 336) disposed in the connection cavity 329 and a second portion 330 extending between the cooling manifold 316 and a generator coupler 332. The generator coupler 332 routes coolant and the electrical connection lines 350, 352, and 354 extending through one of the struts 224 towards the cooling manifold 316 for connection to the generator assembly 300. The structure of the generator coupler 332 will be described in more detail herein with respect to FIG. 4A.

Having described various components of the generator assembly 300 and the propulsion engine 100, various advantages of the structures described with respect to FIGS. 2 and 3 can now be appreciated. For example, referring to FIG. 2, a process of removing the generator assembly 300 from the propulsion engine 100 may include a first step of opening the core cowl 250 via a hinged portion of thereof to facilitate access to the turbine rear frame 222. The aft skin 252 may then be removed via the bolted connection 260 with the outer casing 228 of the turbine rear frame 222. The tail cone 230 may then be removed via a single bolted connection (e.g., to the inner hub 226) to render the generator assembly 300 entirely accessible.

Referring to FIG. 3, after removal of the tail cone 230, the thermal shield 348 may then be removed by removing the connection bolts 327, which also decouples outward ends of the cooling manifold 316 and the coolant guide 318 from the inner hub 226. After removal of the thermal shield 348, the locking nut 344 may then be disengaged from the second shaft 216 to allow the entire rotor assembly 304 to be slid off the second shaft 216 to provide access to the stator assembly 302. After this, a fastener may be removed that couples the mounting flange 310 to the bearing housing 240, enabling the entire stator assembly 302 (including the cooling manifold 316) to be removed from the propulsion engine 100 in the aft direction 270 (e.g., after oil lines supplying oil to the generator assembly 300 from a lubrication system are removed). As such, removal of the entire generator assembly 300 from the propulsion engine 100 may occur in only six steps without disturbing any mechanical couplings of other components of the propulsion engine 100 other than the tail cone 230 and core cowl 250.

The manner with which the generator assembly 300 is positioned and connected within the propulsion engine 100 thus facilitates access and removal of the generator assembly 300 without removing any components of the propulsion engine 100 that are disposed forward (e.g., the opposite of the aft direction 270) or radially-inward of the turbine rear frame 222. Accessing the generator assembly 300 in such a non-invasive manner facilitates maintenance or replacement of various components of the generator assembly 300 while the propulsion engine 100 is disposed on a wing or fuselage of an aircraft, which minimizes time that the aircraft may be out of commission if the generator assembly 300 needs repairs. Furthermore, the manner with which the generator assembly 300 is connected to various components of the propulsion engine 100 provides for a streamlined process for removal of the generator assembly 300 from the propulsion engine 100.

Figure 4A:
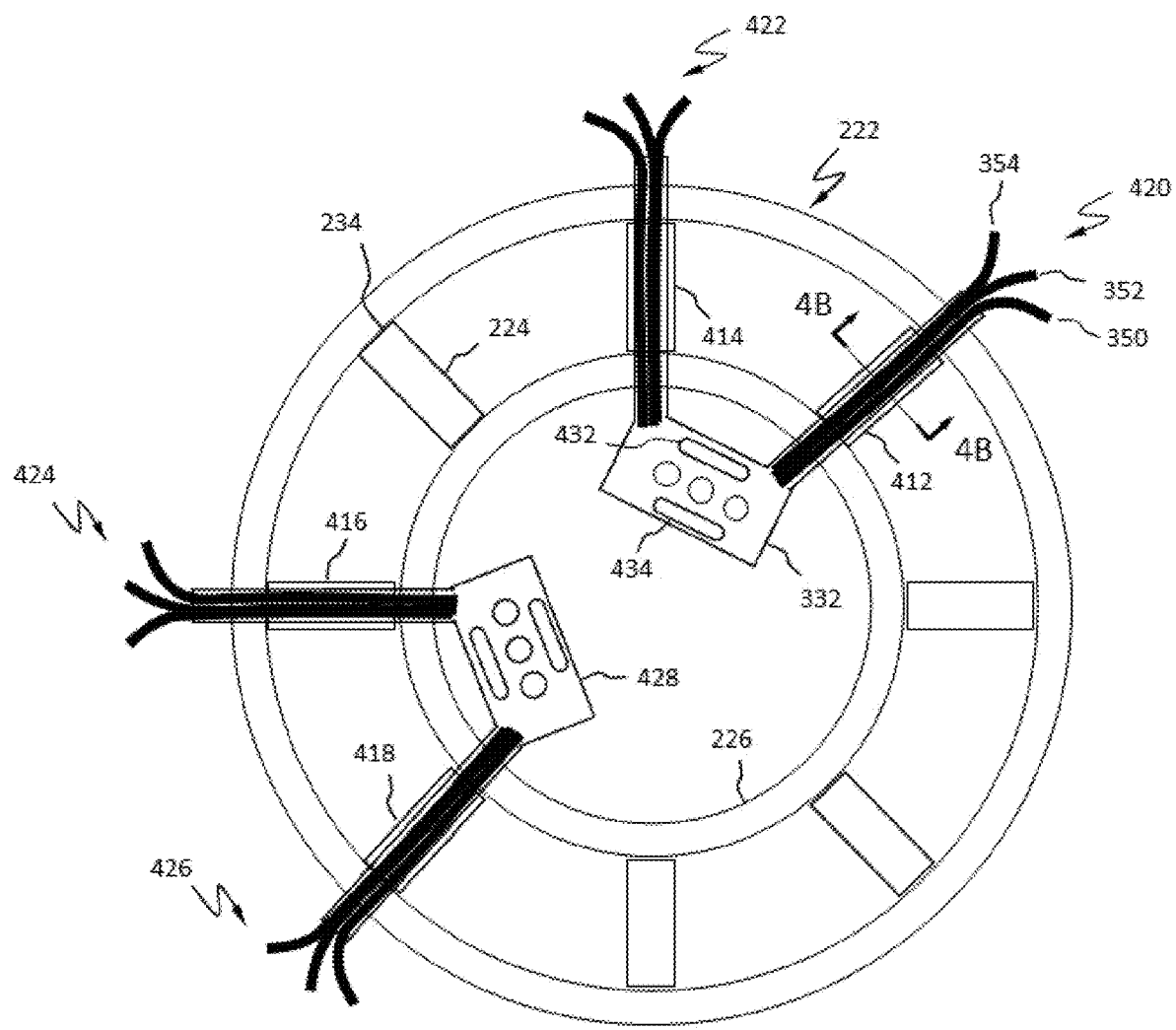
FIG. 4A depicts a perspective view of a turbine rear frame and a generator coupler of the propulsion engine depicted in FIG. 1, according to one or more embodiments described herein.

FIG. 4A depicts a perspective view of the turbine rear frame 222 described herein with respect to FIGS. 1, 2, and 3, according to an example embodiment. In the example shown, electrical connections between the generator assembly 300 (not depicted in FIG. 4A) are established through multiple ones of the plurality of struts 224 of the turbine rear frame 222. A first strut 412 routes a first set of electrical connector lines 420, a second strut 414 routes a second set of electrical connector lines 422, a third strut 416 routes a third set of electrical connector lines 424, and a fourth strut 418 routes a fourth set of electrical connector lines 426. The electrical connector lines 350, 352, and 354 described with respect to FIG. 3 make up the first set of electrical connector lines 420. In embodiments, the first, second, third, and fourth sets of electrical connector lines 420, 422, 424, and 426 are each routed through a separate one of the generator cooling ducts 126 described herein with respect to FIG. 1. It should be understood that the embodiment depicted in FIG. 4A is exemplary only and is not intended to be limiting. For example, embodiments where different numbers of the plurality of struts 224 are used to route electrical connector lines are envisioned. Moreover, the struts of the plurality of struts 224 used to route electrical connector lines may include differing numbers and types of electrical connector lines. For example, in embodiments, some of the plurality of struts 224 may include power cables (e.g., for the power signal(s) generated via the generator assembly 300), while other struts of the plurality of struts 224 may include signal cables (e.g., routing temperature signals generated via a temperature sensor such as a thermocouple of the generator assembly 300, or velocity signals generated via a velocity sensor of the generator assembly 300). As will be understood, the signal cables and the power cables may differ in size based on the different signals contained therein.

As depicted in FIG. 4A, the first, second, third, and fourth struts 412, 414, 416, and 418 that route electrical connector lines to the generator assembly 300 are not adjacent to one another. That is, the plurality of struts 224 includes struts disposed between the first, second, third, and fourth struts 412, 414, 416, and 418. Such an arrangement may avoid restricting the exhaust flow path of the turbine rear frame 222, as the first, second, third, and fourth struts 412, 414, 416, and 418 (or any strut used to route electrical connector lines) may have a different cross-sectional area than other types of struts included in the plurality of struts 224. For example, in addition to struts having a structure described herein with respect to FIG. 4B to route electrical connector lines, the plurality of struts 224 may include service struts that contain service piping (e.g., oil pipes, drain pipes) that are smaller than the struts used to route electrical connector lines. In embodiments, the plurality of struts also includes structural struts that are still smaller than the service struts. The plurality of struts 224 may include any number of each of these types (or any other type of strut) arranged in any manner.

Referring to FIGS. 3 and 4A, the generator coupler 332 is disposed at a first circumferential region of the inner hub 226 of the turbine rear frame 222. As depicted in FIG. 4A, the generator coupler 332 overlaps with the first strut 412 and the second strut 414 in a radial direction such that the generator coupler 332 routes the first and second sets of electrical connector lines 420 and 422 in the aft direction for connection with the generator assembly 300. The generator coupler 332 includes a first coolant opening 432 and a second coolant opening 434. In embodiments, the first and second coolant openings 432 and 434 may correspond in shape to coolant openings of the cooling manifold 316 (e.g., at the connection end 324) described with respect to FIG. 3. Ends of the connections lines 350, 352, and 354 protrude from the generator coupler 332 for mating with the second portion 330 of the connection device 326. A second generator coupler 428 is disposed at a second circumferential region of the inner hub 226. The second generator coupler 428 radially overlaps the third strut 416 and the fourth strut 418 to guide the third and fourth sets of electrical connector lines 424 and 426 towards the generator assembly 300.

The first, second, third, and fourth sets of electrical connector lines 420, 422, 424, and 426 may each carry a separate portion of the power signal generated by the generator assembly 300 and transmitted through the electrical connector 336 (see FIG. 3). The electrical connector 336 may include any number of electrical conductors (or the generator assembly 300 may include any number of electrical connectors 336) to route various portions of the power signal generated via the generator assembly 300 through the first, second, third, and fourth sets of electrical connector lines 420, 422, 424, and 426. As used herein, the "electrical conductor" refers to a conductive portion of an electrical connector line. For example, a power cable may include an electrical conductor and a cover portion providing insulation, electrical shielding, and thermal protection. An electrical connector line may include any number of electrical conductors. In embodiments, each electrical connector line of the first, second, third, and fourth sets of electrical connector lines 420, 422, 424, and 426 is coupled to a separate one of the electrical conductors contained in the electrical connector 336 (e.g., via a separate port in a connection device 326) to route a different portion of the power signal to the converter 112. In embodiments, each portion of the power signal routed by a separate one of the electrical connector lines corresponds to a different phase of the power signal generated by the generator assembly 300.

Still referring to FIG. 4A, in embodiments, each phase of the power signal generated by the generator assembly 300 is divided into different portions that is routed through each one of the first, second, third, and fourth sets of electrical connector lines 420, 422, 424, and 426. In embodiments, the generator assembly 300 includes a plurality of electrical connectors 336 (e.g., six electrical connectors 336), with each electrical connector 336 carrying a single phase (e.g., sets of three of the electrical connectors 336 may each route a three phase power signal to one of the generator couplers 428 and 432). The generator couplers 428 and 432 may divide each three phase power signal in half (e.g., via six electrical connector lines disposed therein) to route each phase through each of the first, second, third, and fourth sets of electrical connector lines 420, 422, 424, and 426. The connections may be arranged such that each of the first, second, third, and fourth sets of electrical connector lines 420, 422, 424, and 426 receives all three phases of the power signal, such that each phase is routed up each of the first, second, third, and fourth struts 412, 414, 416, and 418. Such a connection redundancy ensures that each phase of the power signal will be provided to the converter 112 even if one, two, or even three of the sets of the electrical connections between the generator assembly 300 and the first, second, third, and fourth sets of electrical connector lines 420, 422, 424, and 426 fail. Additionally, dividing the power signals into multiple portions allows for greater flexibility in the type of electrical connector lines that may be used. For example, by dividing the power signals, thinner electrical connector lines may be used to facilitate routing of the electrical connector lines through the turbine rear frame 222.

As depicted in FIG. 4A, the radially outer ends 234 of the first, second, third, and fourth struts 412, 414, 416, and 418 include openings to be coupled to the generator cooling ducts 126 described herein with respect to FIG. 1. Each of the first, second, third, and fourth sets of electrical connector lines 420, 422, 424, and 426 may be routed through a separate one of the generator cooling ducts 126, through a portion of circumferential cooling duct 124, and into the main cooling duct 122 described with respect to FIG. 1. The main cooling duct 122 routes the first, second, third, and fourth sets of electrical connector lines 420, 422, 424, and 426 to the converter 112 for conversion to DC voltage.

Figure 4B:
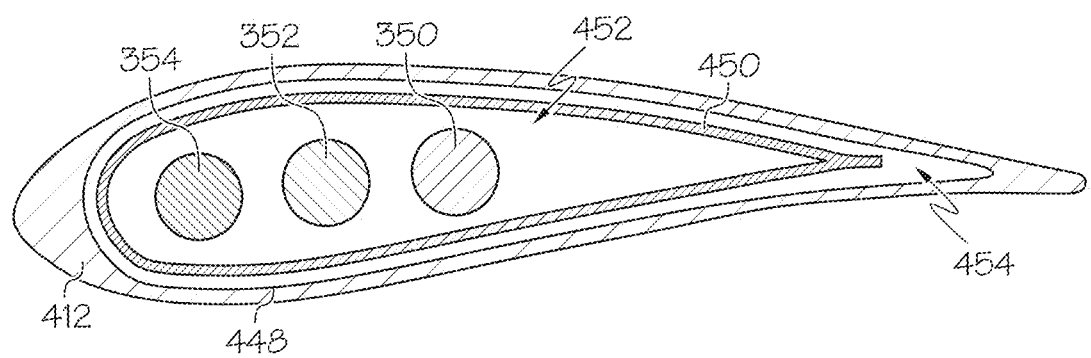
FIG. 4B depicts a cross-sectional view of a strut of the turbine rear frame depicted in FIG. 4A, according to one or more embodiments described herein.

FIG. 4B depicts a cross sectional view of the first strut 412 of the turbine rear frame 222 depicted in FIG. 4A. As depicted, the strut 412 is substantially hollow. For example, in embodiments, the strut 412 is constructed from an outer layer 448 having a wall thickness. In embodiments, a cooling duct 450 extends through the strut 412 to separate an internal volume of the strut 412 into an inner cavity 452 defined by the cooling duct 450 and an outer cavity 454 extending between the cooling duct 450 and the outer layer 448. The cooling duct 450 routes coolant (e.g., from the generator cooling ducts 126 described herein with respect to FIG. 1) from the cooling system 110 to the generator coupler 332. The electrical connector lines 350, 352, and 354 extend through the coolant cooling duct 450 and are routed through the generator coupler 332 to connect to the connection device 326 to conductively connect the stator 314 to the converter 112 described with respect to FIG. 1. In embodiments, a portion of return coolant from the generator assembly 300 (e.g., after circulation through the generator assembly 300) may be routed through the outer cavity 454 for expulsion from the cooling system 110. In embodiments, another portion (e.g., a majority) of such return coolant from the generator assembly 300 may be routed through openings in the tail cone 230 via perforations (not depicted) formed in the generator assembly 300 (e.g., in the connection tab 322 described with respect to FIG. 3).

Figure 5:
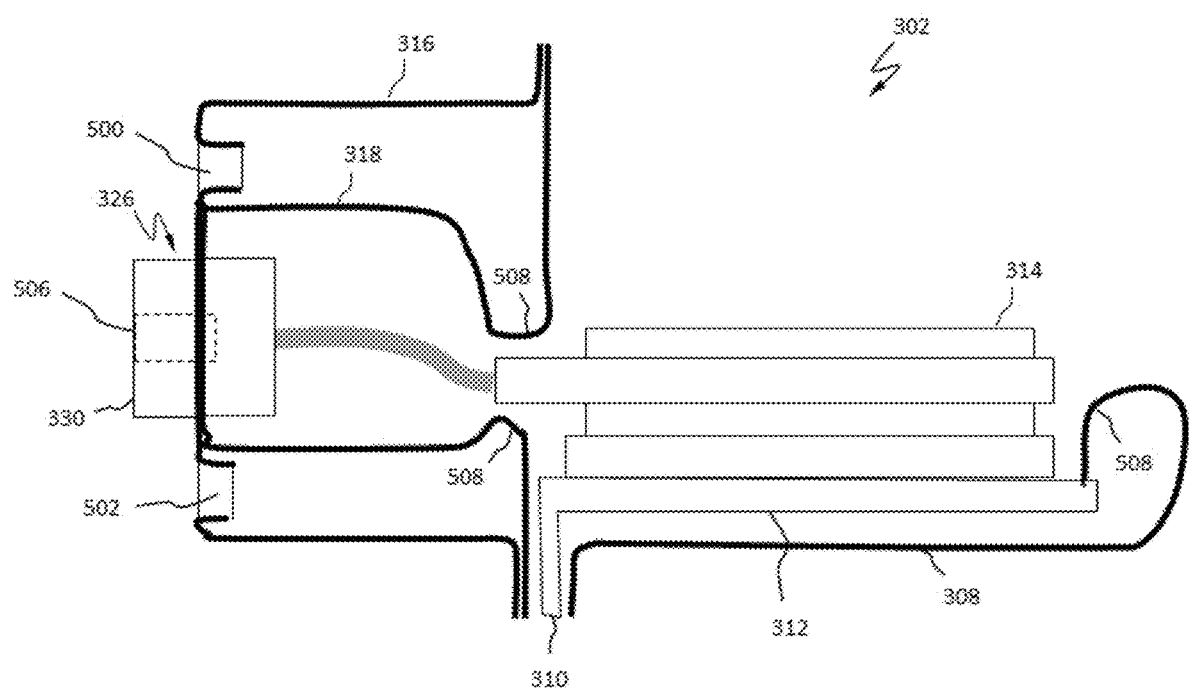
FIG. 5 depicts a cross-sectional view of a stator assembly of the generator assembly depicted in FIG. 3, according to one or more embodiments, described herein.

FIG. 5 depicts a cross-sectional view of a portion of the stator assembly 302. As depicted, the cooling manifold 316 includes a first coolant opening 500 for receiving coolant traveling through one of the struts 224. The first coolant opening 500 may correspond in shape to the first coolant opening 432 of the generator coupler 332 described with respect to FIG. 4A. Still referring to FIG. 5, in embodiments, the cooling manifold 316 also includes a second coolant opening 502 for providing coolant air to the generator assembly 300.

The second portion 330 of the connection device 326 includes a plurality of ports 506 for receiving ends of the electrical connector lines 350, 352, and 354. It should be understood that the configuration of the connection device 326 will vary depending on the mode of operation and the capabilities of the generator assembly 300. For example, depending on a number of phase windings of the stator 314 and the variable rotational speed of the rotor 346, the generator assembly 300 may generate an AC power signal having variable frequency. In embodiments, the electrical connector 336 (not depicted in FIG. 5) extending through the coolant guide 318 may include a number of separate electrical conductors or cables that corresponds to the number of phases in the AC power signal, and the second portion 330 of the connection device 326 includes a number of ports 506 corresponding to that number of phases. In embodiments, multiple electrical connectors 336 extend from various different circumferential portions of the stator 314, and each one of the electrical connectors 336 may contain a portion of the phases in the AC power signal. Different ones of the electrical connectors 336 may be routed to different connection devices coupled to different generator couplers, as described with respect to FIG. 4A.

Figure 6A:
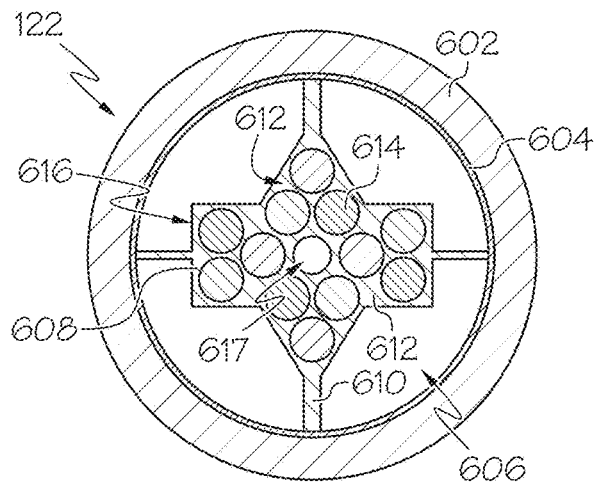
FIG. 6A depicts a cross-sectional view of a first illustrative cooling duct of the propulsion engine depicted in FIG. 1, according to one or more embodiments described herein.

Referring to FIG. 6A, a cross-sectional view of the main cooling duct 122 described herein with respect to FIG. 1 is depicted. The main cooling duct 122 includes an insulation layer 602 disposed around a core 604. The insulation layer 602 thermally insulates the core 604 to prevent heating of air disposed in an internal cavity 606 defined by the core 604. In the example depicted, the core 604 possesses a substantially elliptical cross-section (e.g., a substantially circular cross section), through it should be appreciated that any shape can be used. Moreover, it should be appreciated that the size and shape of the main cooling duct 122 may vary depending on the implementation and available space within the propulsion engine 100.

A plurality of electrical connector lines 614 are routed through the main cooling duct 122. The plurality of electrical connector lines 614 may correspond to the electrical connector lines of the connection assembly 108 described herein with respect to FIG. 1. In embodiments, the plurality of electrical connector lines 614 are each a separate power cable including electrical shielding. The plurality of electrical connector lines 614 are routed through the main cooling duct 122 via a support bracket 608. The support bracket 608 includes a plurality of support arms 610 attached to the core 604. The support arms 610 extend inward from the core 604 and support a body 612 of the support bracket 608 within the internal cavity 606. The support arms 610 beneficially prevent contact between the body 612 and the core 604 such that air may be routed around the body 612 to cool the entirety of the body 612. The body 612 includes openings 616 through which the plurality of electrical connector lines 614 extend. Because the body 612 is supported within the internal cavity 606 and cooled on all sides, the electrical connector lines 614 are also maintained at a lower temperature than if the electrical connector lines 614 were not routed through the main cooling duct 122. As such, the support brackets 608 facilitate using electrical connector lines 614 that are smaller and include less thermal shielding, reducing the overall weight of the electrical system 102.

As depicted, the support bracket 608 supports 12 different electrical connector lines 614. The openings 616 in the body 612 may be arranged based on the manner with which the electrical connector lines 614 are routed through the cooling system 110. For example, as depicted, the openings 616 are arranged in four groupings of three, with each grouping corresponding to a set of electrical connector lines that is eventually separated within the cooling system 110 (e.g., in a manner similar to the first, second, third, and fourth sets of electrical connector lines 420, 422, 424, and 426 described herein with respect to FIG. 4A). It should be understood that various alternative routing schemes are envisioned based on the implementation. For example, certain embodiments may utilize power cables containing a plurality of electrical conductors (rather than each power cable containing a single electrical conductor, as depicted in FIG. 6A).

In embodiments, the support bracket 608 only partially extends through the main cooling duct 122 and the plurality of electrical connector lines 614 are supported within the main cooling duct 122 at a plurality of discrete locations throughout the main cooling duct 122 via a plurality of the support brackets 608. Positioning a plurality of the support brackets 608 throughout the main cooling duct 122 may beneficially maintain the plurality of electrical connector lines 614 in a central region of the internal cavity 606 to facilitate coolant being evenly distributed around the body 612. Such a coolant distribution maintains each of the plurality of electrical connector lines at a cool temperature. Maintaining a positioning of the plurality of electrical connector lines 614 within a central region the internal cavity 606 also prevents contact between the plurality of electrical connector lines 614 and the core 604 to prevent wear and heating of the plurality of electrical connector lines 614.

Still referring to FIG. 6A, the body 612 of the support bracket 608 further includes a central opening 617 not containing an electrical connector line. The central opening 617 allows coolant to flow through a central region of the support bracket 608 and reduces disruptions of coolant flow caused by the support bracket 608. Additionally, the central opening 617 beneficially allows coolant to flow proximate to electrical connector lines of the plurality of electrical connector lines 614 that are centrally disposed within the body 612, and thus displaced from direct contact with coolant flowing around an external surface of the body 612.

Figure 6B:
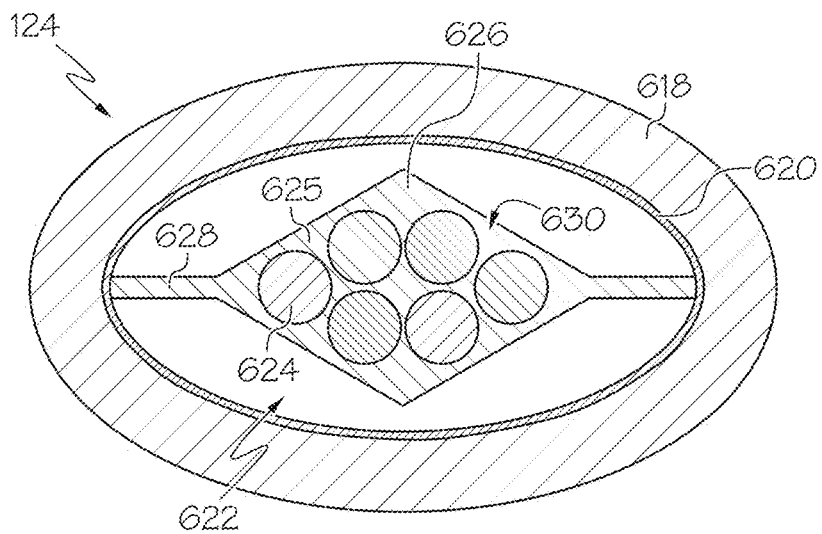
FIG. 6B depicts a cross-sectional view of a second illustrative cooling duct of the propulsion engine depicted in FIG. 1, according to one or more embodiments described herein.

FIG. 6B depicts a cross-sectional view of the circumferential cooling duct 124 described herein with respect to FIG. 1. The example depicted includes an insulation layer 618 and a core 620. The core 620 defines an internal cavity 622. The circumferential cooling duct 124 may have a different cross-section than the main cooling duct 122 described with respect to FIG. 6A due to space constraints in the region of the propulsion engine 100 where the circumferential cooling duct 124 is disposed. Such a different size and shape of the circumferential cooling duct 124 may necessitate a different support bracket structure for electrical connector lines extending therethrough. In embodiments, the circumferential cooling duct 124 may have the same or similar cross-section as the main cooling duct 122.

As depicted in FIG. 6B, a plurality of electrical connector lines 624 (e.g., corresponding to a subset of the electrical connector lines 614 described with respect to FIG. 6A) are supported within the internal cavity 622 via a support bracket 625. The support bracket 625 includes a body 626 and support arms 628 attached to the core 620 and supporting the body 626 within the internal cavity 522. Similar to the support bracket 608 described with respect to FIG. 6A, the body 626 may include a plurality of openings 630 for receiving the plurality of electrical connector lines 624 that are arranged based on a manner with which the plurality of electrical connector lines 624 are routed through a remainder of the cooling system 110 (e.g., the way the plurality of electrical connector lines 624 are divided between the generator cooling ducts 126).

Figure 6C:
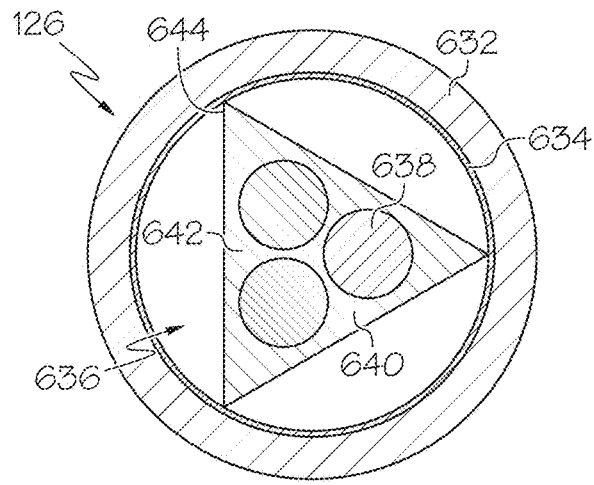
FIG. 6C depicts a cross-sectional view of third illustrative cooling duct of the propulsion engine depicted in FIG. 1, according to one or more embodiments described herein.

Referring now to FIG. 6C, a cross-sectional view of one of the generator cooling ducts 126 described with respect to FIG. 1 is shown. The example depicted includes an insulation layer 632 and a core 634. The core 634 defines an internal cavity 636. The generator cooling duct 126 may have a different cross-section than the circumferential cooling duct 124 described with respect to FIG. 6B due to space constraints in the region of the propulsion engine 100 where the generator cooling duct 126 is disposed. Such different size and shape of the generator cooling duct 126 may necessitate a different support bracket structure for electrical connector lines extending therethrough. In embodiments, the generator cooling ducts 126 may have the same or similar cross-section as the circumferential cooling duct 124.

As depicted in FIG. 6C, a plurality of electrical connector lines 638 (e.g., corresponding to a subset of the electrical connector lines 624 described with respect to FIG. 6B) are supported within the internal cavity 636 via a support bracket 640. The support bracket 640 includes a body 642 with attachment points 644 that connect to the core 634. Unlike the support bracket 625 described with respect to FIG. 6B, the support bracket 640 does not include support arms to facilitate mounting within the smaller generator cooling ducts 126 while still providing adequate clearance for coolant flow. The support bracket 640 may include support arms in alternative embodiments. In embodiments, the plurality of electrical connector lines 638 depicted in FIG. 6C corresponds to a set of electrical connector lines that is routed through one of the struts 224 of the turbine rear frame 222 (e.g., corresponding to one of the first, second, third, and fourth sets of electrical connector lines 420, 422, 424, and 426 described herein with respect to FIG. 4A).

In view of the foregoing description, it should be appreciated that collocating an electrical connection and a coolant connection of a generator assembly to a propulsion engine facilitates a compact design for the generator assembly while providing numerous other benefits. For example, routing electrical connector lines conductively connected to the generator assembly through cooling ducts facilitates cooling of the electrical connector lines, thereby facilitating weight savings by reducing thermal insulation requirements for the electrical connector lines. Such weight savings are further enhanced in embodiments where the generator assembly is disposed in an aft portion of the propulsion engine and the electrical connector lines axially extend through the propulsion engine. Such positioning of the generator assembly in the aft portion beneficially renders the generator assembly accessible for maintenance and repair while the propulsion engine is installed on a wing or fuselage of an aircraft. Moreover, the collocated connections described herein facilitate efficient removal and replacement of the components of the generator assembly by requiring a relatively small number of connections to be removed as compared to existing structures not including the collocated connections described herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" (or "substantially" or "approximately") is used in describing a value or an endpoint of a range, the specific value or end-point referred to is comprised. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint. For example, the approximating language may refer to being within a 1, 2, 4, 10, 15, or 20 percent margin in either individual values, range(s) of values and/or endpoints defining range(s) of values.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" comprise plural referents unless the context clearly dictates otherwise. Thus, for example, reference to "a" component comprises aspects having two or more such components, unless the context clearly indicates otherwise.

Further aspects of the invention are provided by the subject matter in the following clauses:

1. A generator assembly comprises a stator assembly coupled to an engine stator component of a propulsion engine, the stator assembly comprising: a stator support structure fixedly attached to the engine stator component; a stator disposed on a supporting surface of the stator support; a manifold coupled to the stator support, the manifold defining a connection volume and comprising at least one coolant opening at a connection end of the manifold; and an electrical connector extending between the stator and a connection device disposed on the connection end; and a rotor assembly comprising a rotor support structure connected to a shaft of the propulsion engine and a rotor attached to the rotor support structure, wherein the rotor rotates in conjunction with the shaft to generate a power signal that travels through the electrical connector to the connection device.

2. The generator assembly of any preceding clause, further comprising a cooling duct in fluid communication with a coolant supply and a generator coupler connecting the stator assembly to the cooling duct, wherein the generator coupler includes an opening in fluid communication with the coolant opening of the manifold such the coolant from the coolant supply is provided into the connection volume via the generator coupler.

3. The generator assembly of any preceding clause, further comprising an electrical conductor extending through the cooling duct and the generator coupler to the connection device such that the electrical conductor is conductively connected to the electrical connector via the connection device.

4. The generator assembly of any preceding clause, wherein a plurality of electrical conductors extend through the cooling duct and the generator coupler to the connection device such that each of the electrical conductors is conductively connected to the electrical connector and the power signal is provided to the plurality of electrical conductors via the connection device.

5. The generator assembly of any preceding clause, wherein a number of electrical conductors in the plurality of electrical conductors corresponds to a number of phases in the power signal.

6. The generator assembly of any preceding clause, wherein the engine stator component comprises a turbine frame comprising a strut, wherein the cooling duct extends through the strut into the generator coupler, wherein the strut comprise an airfoil or vane.

7. The generator assembly of any preceding clause, wherein the generator coupler is attached to an inner hub of the turbine frame.

8. The generator assembly of any preceding clause, wherein the manifold comprises an opening creating fluid communication between the connection volume and at least one of the rotor, the stator, the rotor support structure, and the stator support structure.

9. A propulsion engine comprises a core portion generating exhaust that travels in an axial direction; a turbine section coupled to a shaft, wherein the turbine section receives the exhaust and generates mechanical energy to rotate the shaft; a turbine frame attached to the turbine section, the turbine frame comprising an outer casing coupled to the turbine section; an inner hub supporting the shaft via a bearing assembly; and a plurality of struts extending between the outer casing and the inner hub, wherein at least one strut of the plurality of struts defines an internal cavity having a cooling duct disposed therein; and an electrical system comprising: a generator assembly coupled to the shaft and to the inner hub via a generator coupler; and an electrical connector line extending through the cooling duct and the generator coupler to a connection device electrically coupled to the generator assembly, wherein the generator assembly comprises a manifold that includes a coolant opening to receive coolant from the cooling duct via the generator coupler, wherein the plurality of struts may comprise an airfoil or vane.

10. The propulsion engine of any preceding clause, wherein the electrical system comprises a plurality of electrical connector lines extending through the cooling duct and the generator coupler to the connection device.

11. The propulsion engine of any preceding clause, wherein at least two of the plurality of struts of the turbine rear frame define internal cavities having cooling ducts therein, wherein each of the internal cavities of the at least two of the plurality of struts include electrical connector lines extending therethrough to connect to the generator assembly.

12. The propulsion engine of any preceding clause, wherein a first one of the electrical connector lines extends through a first one of the cooling ducts and through a first generator coupler in fluid communication with a first coolant opening in the manifold, wherein a second one of the electrical connector lines extends through a second one of the cooling ducts through a second generator coupler in fluid communication with a second coolant opening in the manifold.

13. The propulsion engine of any preceding aspect, wherein a first strut of the at least two of the plurality of struts defining an internal cavity having a cooling duct therein includes a power cable extending therethrough, and a second strut of the at least two of the plurality of struts defining an internal cavity having a cooling duct therein includes a signal cable extending therethrough.

14. The propulsion engine of any preceding clause, wherein the generator assembly comprises: a stator assembly coupled to the turbine frame via a bearing housing, the stator assembly comprising a stator support structure fixedly attached to the bearing housing, the stator support structure supporting the manifold; and a rotor assembly comprising a rotor support structure connected to the shaft and a rotor attached to the rotor support such that the rotor assembly is disposed radially outward of the stator assembly.

15. The propulsion engine of any preceding clause, wherein the rotor assembly is secured to the shaft via a connection such that the rotor assembly, stator support structure, and manifold are removable from the propulsion engine without removing any components of the propulsion engine that are disposed forward or radially outward of the generator assembly.

16. The propulsion engine of any preceding clause, wherein the rotor assembly and the stator assembly are accessible for repair or replacement while the propulsion engine is installed on an aircraft.

17. The propulsion engine of any preceding clause, further comprising a converter for converting a power signal generated by the generator assembly into a DC voltage, the converter conductively connected to the generator assembly via the electrical connector line; and a main cooling duct in fluid communication with a coolant source, the main cooling duct extending at least partly between the converter and the turbine frame, wherein the electrical connector line extends through the main cooling duct into the cooling duct, wherein the electrical connector line is supported within the main cooling duct via a first support bracket and supported within the cooling duct via a second support bracket that is different than the first support bracket.

18. A propulsion engine comprises a shaft; an electrical system comprising a generator assembly disposed in the propulsion engine, the generator assembly coupled to the shaft; and an electrical connector line extending from the generator assembly; a cooling system comprising a first cooling duct in fluid communication with a coolant source, wherein the electrical connector line extends through the first cooling duct such that the electrical connector is cooled via coolant from the coolant source; and a first plurality of support structures supporting electrical connector line at a plurality of discrete locations within the first cooling duct, wherein each of the first plurality of support structures contacts an internal surface of the first cooling duct at a plurality of points such that the electrical connector does not directly contact an internal surface of the first cooling duct.

19. The propulsion engine of any preceding clause, further comprising: a second cooling duct in fluid communication with the first cooling duct, the second cooling duct having a different cross-sectional area than the first cooling duct, wherein the electrical connector line extends through both the first cooling duct and the second cooling duct; and a second plurality of support structures supporting the electrical connector line at a plurality of discrete locations within the second cooling duct, wherein the second plurality of support structures have a different structure than the first plurality of support structures.

20. The propulsion engine of any preceding clause, wherein the electrical connector line comprises a plurality of electrical conductors, wherein each the first plurality of support structures comprises a first plurality of cavities for the plurality of electrical conductors, wherein each the second plurality of support structures comprises a second plurality of cavities for a portion of the plurality of electrical conductors.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A generator assembly, comprising:
a stator assembly coupled to an engine stator component of a propulsion engine, the stator assembly comprising:
a stator support structure fixedly attached to the engine stator component;
a stator disposed on a supporting surface of the stator support structure;
a manifold coupled to the stator support structure, the manifold defining a connection volume and comprising at least one coolant opening at a connection end of the manifold; and
an electrical connector extending between the stator and a connection device, the connection end of the manifold forming a radial wall that extends radially inward past the connection device such that the connection device is disposed on the connection end; and
a rotor assembly comprising a rotor support structure connected to a shaft of the propulsion engine and a rotor attached to the rotor support structure, wherein the rotor rotates in conjunction with the shaft to generate a power signal that travels through the electrical connector to the connection device.

2. The generator assembly of claim 1, further comprising a cooling duct in fluid communication with a coolant supply and a generator coupler connecting the stator assembly to the cooling duct, wherein the generator coupler includes an opening in fluid communication with the coolant opening of the manifold such the coolant from the coolant supply is provided into the connection volume via the generator coupler.

3. The generator assembly of claim 2, further comprising an electrical conductor extending through the cooling duct and the generator coupler to the connection device such that the electrical conductor is conductively connected to the electrical connector via the connection device.

4. The generator assembly of claim 3, wherein a plurality of electrical conductors extend through the cooling duct and the generator coupler to the connection device such that each of the electrical conductors is conductively connected to the electrical connector and the power signal is provided to the plurality of electrical conductors via the connection device.

5. The generator assembly of claim 4, wherein a number of electrical conductors in the plurality of electrical conductors corresponds to a number of phases in the power signal.

6. The generator assembly of claim 2, wherein the engine stator component comprises a turbine frame comprising an airfoil, strut, or vane, wherein the airfoil, strut, or vane comprises the cooling duct and the cooling duct extends through an interior of the airfoil, strut, or vane into the generator coupler.

7. The generator assembly of claim 6, wherein the generator coupler is attached to an inner hub of the turbine frame.

8. The generator assembly of claim 6, wherein the manifold comprises an opening enabling fluid communication between the connection volume and at least one of the rotor, the stator, the rotor support structure, and the stator support structure.

\* \* \* \* \*